Aug. 2, 1938.　　　S. LAKE　　　2,125,301
SALVAGE APPARATUS
Filed March 12, 1934　　　8 Sheets-Sheet 1

Aug. 2, 1938.         S. LAKE                 2,125,301
              SALVAGE APPARATUS
         Filed March 12, 1934        8 Sheets-Sheet 5

INVENTOR
BY *Simon Lake*
ATTORNEY

Aug. 2, 1938.  S. LAKE  2,125,301

SALVAGE APPARATUS

Filed March 12, 1934  8 Sheets-Sheet 7

INVENTOR
Simon Lake
BY
ATTORNEY

Patented Aug. 2, 1938

2,125,301

UNITED STATES PATENT OFFICE 2,125,301

SALVAGE APPARATUS

Simon Lake, Milford, Conn.

Application March 12, 1934, Serial No. 715,202

6 Claims. (Cl. 61—69)

This invention relates to apparatus to be used in shallow waters along the coast and in bays and rivers, wherever the water bed is of a character suitable to support the weight of the apparatus.

One object of the invention is to provide a mobile platform arranged above the surface of the water in which the apparatus is to be used, this platform adapted to carry machinery whereby operations of various kinds may be performed. Or the apparatus may be propelled alongside of a stranded ship to rescue and safely transport people therefrom to the land, despite heavy surf in which lifeboats could not be operated.

A further object is to provide an apparatus for systematic harvesting of swimming fish or shell fish found lying either on or below the water bed, or in working gold or other placer mines, which form the waterbeds of many rivers.

A still further object is to provide a method of rapidly locating the hulks and cargoes of long-lost sunken ships, even though they may have disappeared entirely below the waterbed or have been covered with sand or mud, as frequently occurs where certain kinds of water bottom are found.

Another object is to provide apparatus for and a method of recovering the cargoes of sunken vessels lying close in shore in coastal waters where the surf and ground swell make it impractical for divers to work by descending from vessels anchored on the surface, and also for performing various kinds of engineering work, such as the preparation of foundations for lighthouses, piers, breakwaters, fish traps, etc., where such operations may be better carried on by operating derricks and other machinery from a stable platform not affected by the waves or currents which usually prevail to a certain degree in coastal waters.

In the accompanying drawings illustrating the invention, in the several figures of which like parts are similarly designated.

Figure 1:
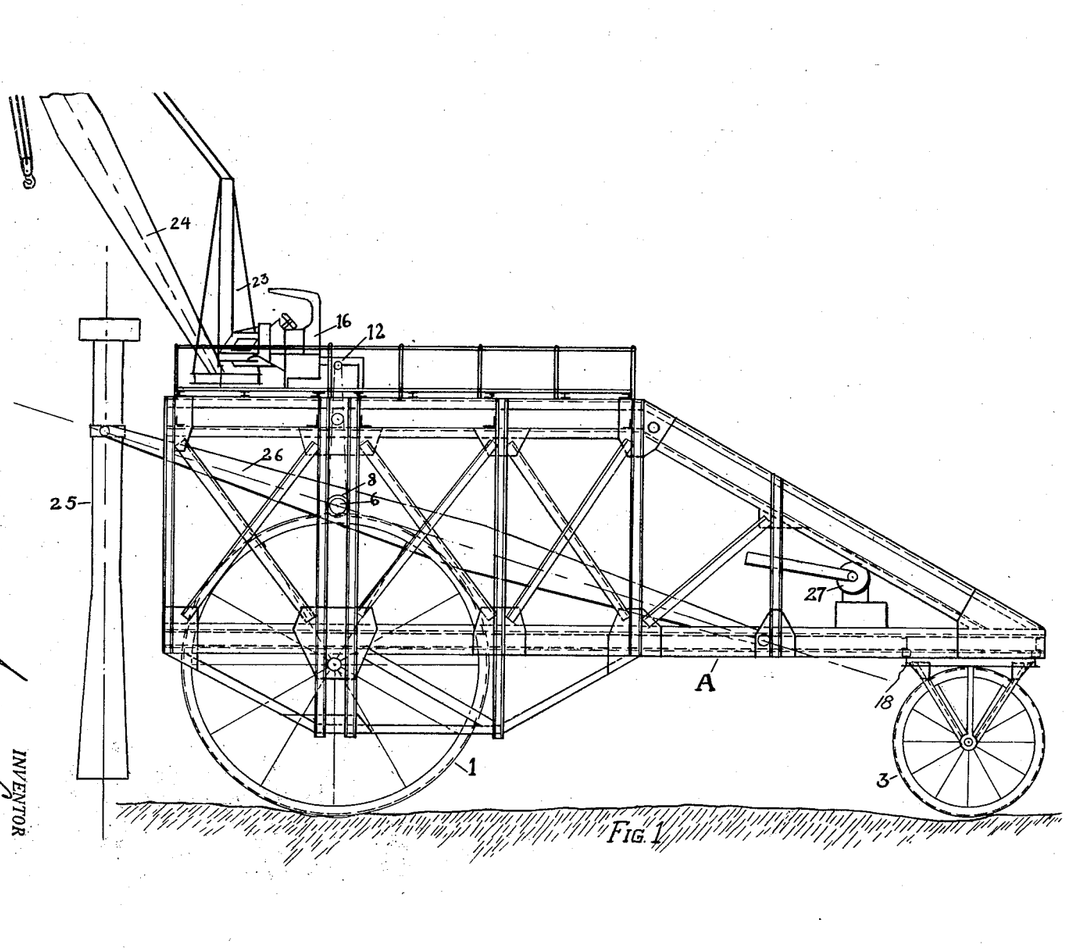
Figure 1 is a side elevation of the mobile apparatus of the invention, showing some of its preferred attachments in broken lines.
Figure 2:
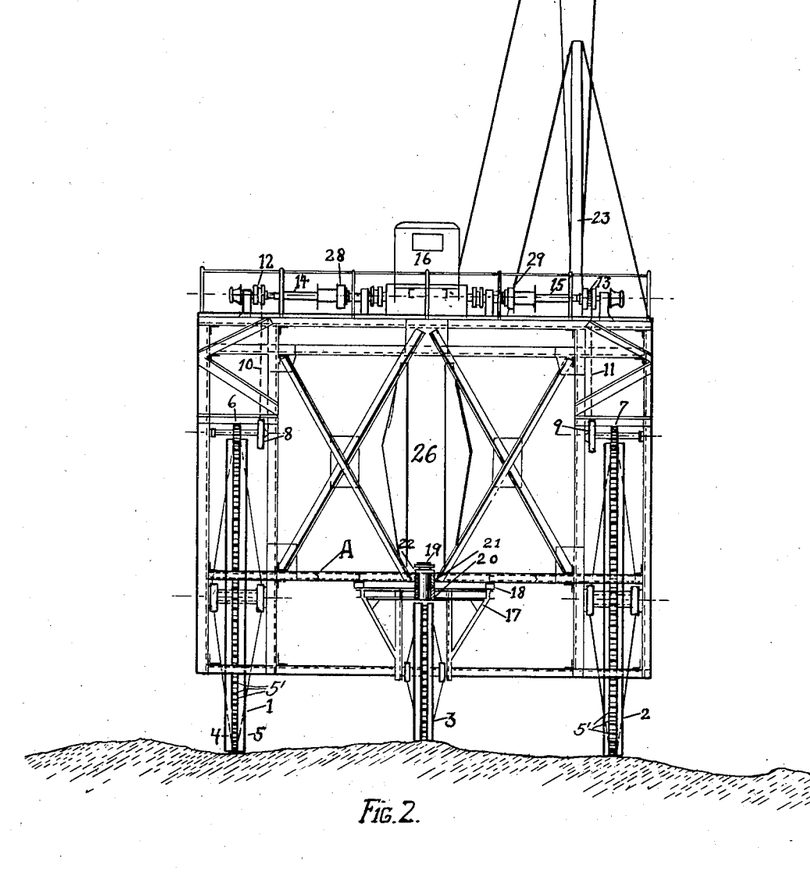
Fig. 2 is an end view of the apparatus, looking forward, or toward the left of Fig. 1.

Referring now to Figs. 1 and 2, A is a trussed framework mounted on three wheels 1, 2 and 3. These wheels are shown built up of angles 4 and 5, see Fig. 2, spaced apart by numerous spacer bolts 5' which form a means complemental to and with which the pinions 6 and 7 may mesh. The pinions 6 and 7 are driven by sprockets 8 and 9 through chains indicated by dotted lines at 10 and 11 which are driven in turn by sprockets 12 and 13 mounted on shafts 14 and 15 which are formed as extensions of the driving shafts of suitable mechanism such as that of a motor truck shown diagrammatically at 16. In this manner I am able to utilize the variable speeds such as are provided in the drive mechanisms of high powered trucks, but at a great reduction of linear velocity of the apparatus due to the small diameter of the driving pinions 6 and 7 and the large diameter of the driven wheels 1 and 2. These wheels are preferably made similar to bicycle wheels in order to give them great strength with comparatively little weight.

The steering wheel 3 is carried in a structural frame composed of circular channels and angles as shown at 17, and a ring 18 secured to the structural frame A acts as a bearing to hold the structural framework 17 in proper alignment. A center shaft 19 (Fig. 2) secured in a member 20 in framework 17 and extending up through a bearing member 21 carried by the main frame A is held in position by a flanged nut 22 and holds the structural frame 17, with its wheel 3, in close revoluble contact with the main frame A. This, with the three wheels, provides a three-point support and prevents racking of the frame in passing over uneven ground. Wire ropes or chains, not shown, pass around the upper circular channel forming part of frame 17. These ropes or chains are led to a suitable steering gear placed in any desired position on the upper platform in accordance with the practice common in leading wire ropes or chains from the quadrant on a rudder post to the pilot house of a steamship.

In Fig. 1 I have indicated somewhat diagrammatically by broken lines a derrick mast 23 and a derrick boom 24, and as these parts are of standard or conventional form it is considered unnecessary to show their construction in detail. I have also shown a submarine inspection tube 25 and have indicated, in broken lines, its supporting boom 26. I also have indicated diagrammatically, in broken lines, a centrifugal pump 27. These parts are shown more in detail in Fig. 4. On shafts 14 and 15 (Fig. 2) I have shown two clutch operated drums 28 and 29. Other hoists of standard types, not shown, may be used in connection with the derrick etc., the construction and operation of which are well known.

Figure 3:
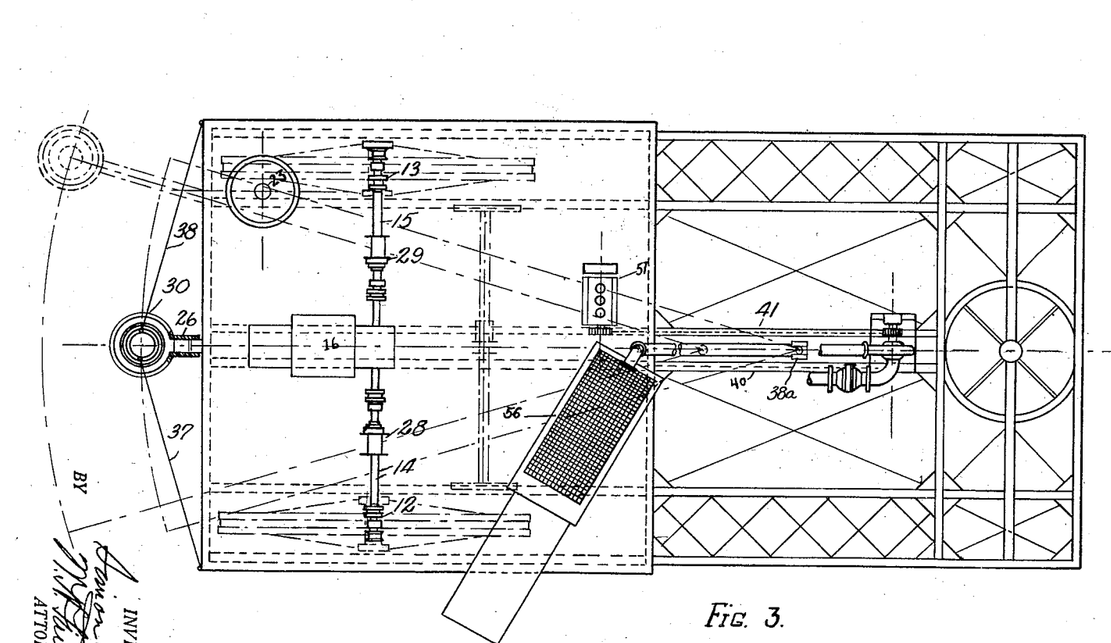
Fig. 3 is a plan view of the apparatus, illustrating diagrammatically the installation of some of the propelling, hoisting and pumping machinery.
Figure 4:
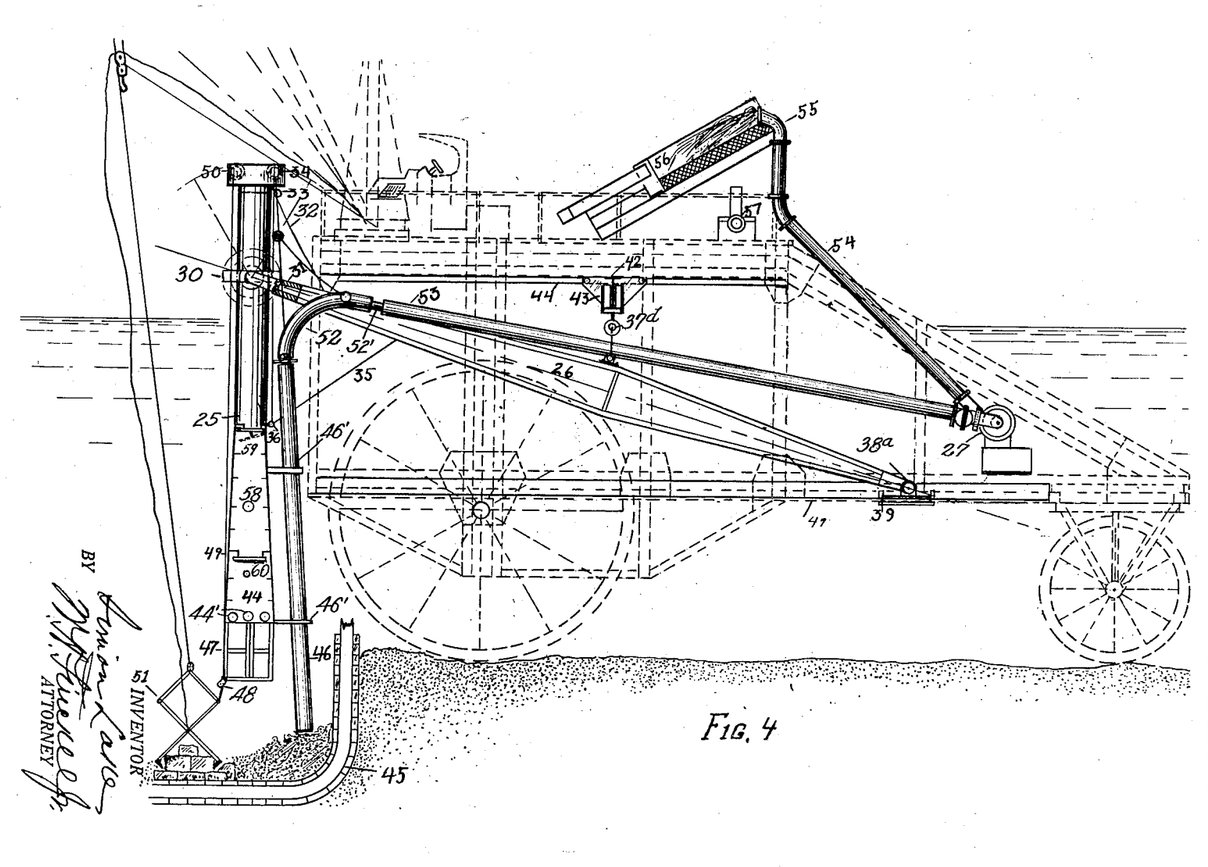
Fig. 4 is a view showing in broken lines the framework of the apparatus and showing certain of the auxiliary attached apparatus in full lines.

Referring now to Fig. 4, it will be seen that the submarine inspection tube 25 is carried by a gimbal ring 30 mounted at the end of the boom 26 by a swivel bearing 31, thus permitting the tube 25 to be swung in any direction or hoisted up in a horizontal position above the surface of the water (see broken lines Fig. 3). Line 32 secured to the boom 26 runs through a guide block 33 to a drum 34, and line 35, also secured to boom 26, runs through guide block 36 to a similar drum in axial alignment with and back of drum 34. By taking in on one line and paying out on the other the lower portion or inspection chamber of the tube 25 may be swung back and forth in line with the longitudinal axis of the boom. Other lines, as 37 and 38, shown in Fig. 3, swing the bottom of the tube laterally of the apparatus.

The boom 26 and its attached inspection tube 25 are raised and lowered by an electric, air, hydraulic or other suitable hoist indicated at 37ª. The lower end of the boom is carried in a swiveling jaw 38ª which, in turn, is supported in a movable carriage 39 which slides on the lower inner flanges of I-beams 40 and 41 and hence may be adjusted longitudinally of the wheeled structure.

The hoist 37ª is mounted upon a carriage traveling transversely of the apparatus on I-beam 42, and this I-beam 42 is, in turn, supported by a pair of similar carriages 43, only one of which is shown, in such manner that it may travel longitudinally of the apparatus. Suitable mechanisms, not shown, impart desired longitudinal and transverse movement to these carriages so that the hoist may be moved from the position shown to other desired positions. For example, by moving the hoist to the forward part of the apparatus, the boom and its submarine inspection tube may be projected well out beyond the forward end of the apparatus, and an observer stationed in diver's compartment 44 can, by telephoning to the surface, give directions to have the inspection tube raised or lowered or swung to various positions to enable him to make a most thorough investigation of the surrounding waterbed or of the contents of the hulk of a sunken ship. Where such hulk has worked down into the waterbed, and this usually happens if the waterbed is composed of fine sand or loose gravel or mud, it is first necessary to pump the mud or sand out of the hulk before access may be had to the cargo.

When a vessel is stranded on a sand bar or beach in a heavy storm, the pounding of the vessel usually ruptures some of the vessel's bottom planking or plates and the hydrostatic pressure of the water flowing into the vessel carries a lot of sand with the inrush of the sea and the vessel settles hard on the bottom due to her loss of buoyancy, but in case of undertow or strong currents of any kind, and the ship is heavily loaded, and the seas are strong enough to cause the hull to roll slightly, what might be termed a water squeezing action takes place between the ship's bottom and the waterbed at every roll, and if the bottom is sand, gravel or mud a certain percentage of these materials will be carried out with the water and the hull will sink rapidly into the bottom. In some localities, like the Goodwin Sands in the English Channel, the ruptured hulls of stranded ships have been known to entirely disappear within a few hours of stranding, but on more stable bottom the ship will continue to settle only as long as movement of the hull, due to wave action, continues. However, as there is always a large amount of sediment in waters near the coast or on sand bars in time of storm, the hulk will soon fill up to the level of the waterbed outside. In my submarine work I have frequently found hulks of vessels embedded in the bottom nearly up to their decks, and in the majority of cases the decks of wooden vessels thus embedded have entirely disappeared, due to the action of the toredo, or of corrosion, which takes place above the waterbed, especially where they have been submerged for long periods of time, but the portion of the hulk embedded in mud or sand below the waterbed will remain intact for hundreds of years. Many embedded hulks of vessels having imperishable cargoes lie off the various coast lines of the world wherever ships have stranded on waterbeds of the nature described. I have indicated the hulk of such an embedded vessel at 45, Fig. 4, and have shown the hulk partially pumped free of sand and exposing the contents. Operations of this kind may be readily conducted in quiet weather and when the waterbed is not being disturbed by heavy currents such as are caused by storms.

A suction pipe 46 is so mounted on the apparatus as to be raised and lowered by a line attached to the derrick or otherwise, but is held preferably in close proximity to the inspection tube by guides or the like 46'.

The procedure for clearing a stranded hulk of sand or mud is to propel the apparatus from the shore until its forward wheels are in about the position shown adjacent to the hulk. This position can readily be determined by an observer in the inspection tube 25. It will be noted that a cage 47 of suitable, strong construction, extends below the lower end of the inspection chamber. This cage permits the observer to put on a diving dress and get a closer view of the operation of pumping out the hulk without danger of being drawn up to the suction pipe or jammed against the suction pipe or inspection tube, or of having the cargo or old wreckage fall in on him.

A guide block 48 is shown attached to the lower part of the cage, and a down-haul line 49 passes through this guide block and has its upper end carried to a drum 50 on the platform at the upper end of the tube. The other end of this line 49 is attached to a cargo grab 51. Thus the cargo grab may be brought into the position shown, and as the inspection tube 25 may be raised or lowered or swung to any position, it is obvious it can be placed so that the cargo grab can be brought directly over any object it is desired to pick up. Any desired type of grab may be used, or a powerful magnet may be substituted therefor in recovering ferrous metals.

The suction pipe 46 is shown with a flexible intermediate section 52 secured to a telescopic section 52' which slides in a pipe 53, thus permitting it to follow the inspection tube as it is projected out from the main structure.

Pipe 53 is connected to the suction side of the centrifugal pump 27, and the discharge from this pump is through a pipe 54 and elbow 55 to a separator box 56. Screens of any desired mesh may be placed in the bottom and sides of the separator box to collect such materials as coal or other valuable products and permit the water, sand and mud to pass overboard or be led some distance away from the apparatus through a suitable conduct. The coal or other valuable products may be delivered to boats brought alongside or they may be delivered through pipe lines to the shore.

An engine 57 may be used to drive the centrifugal pump 27 by the use of suitable connections, not shown.

Communication between the lower compartment or inspection cage and the upper platform is afforded through an air lock 58 having doors 59 and 60 opening outward or against the sea pressure, to permit the passage of properly dressed inspectors or divers.

Where the apparatus is to be used when heavy undertow or variable currents prevail, it is desirable to have as little surface exposed as possible and, therefore, I have shown the inspection tube 25 as of a cylindrical form and about thirty inches in diameter at its lower end. If a diver is to be sent out of the tube, as may be necessary at times, door 60 is left open, and the diver's tender may stand in the air-lock above to place the diver's helmet in position. If the tender is provided with a light rubber suit he can stand in the cage with his head in compartment 44 and look out through the lower windows 44', it being understood, of course, that the air pressure within the compartment 44 is maintained equal to the hydrostatic pressure of the water at the depth at which the lower end of the tube is submerged. This arrangement permits a diver and his tender to operate together in performing under-water operations, and this has many advantages in connection with certain kinds of work.

The combination of swinging inspection tube and attached suction pipe may also be used in recovering edible shell fish, such as the surf clam and razor clam, which frequently grow in abundance in turbulent shallow waters, and which burrow to a considerable depth below the waterbed. The presence of clams of these species may be recognized by inspecting the waterbed, as small openings or tunnels extend from the embedded clams to the surface of the waterbed. By locating these small openings and placing the end of the suction pipe over them the clams may be drawn up through the pump and discharged onto the screen from which they may be collected.

Figure 5:
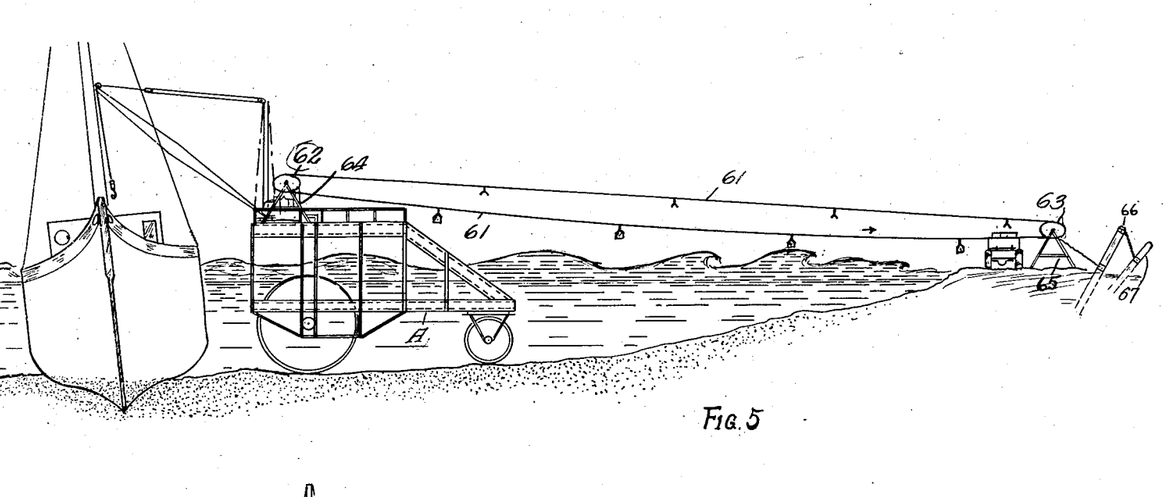
Fig. 5 shows the apparatus alongside of a vessel stranded near the shore, and illustrates means for removing cargo with a traveling cable.

Fig. 5 shows the apparatus alongside a stranded vessel, and illustrates the method of removing cargo and transferring it to the shore by means of a cable 61 carried by two blocks 62 and 63 mounted respectively on a structural support 64 secured to the platform of the mobile salvaging apparatus A and a similar support 65 erected on the beach and held by anchors or timbers embedded in the ground, as shown at 66 and 67.

If, as shown, the stranded vessel is fairly close to the shore, and the cargo is in boxes, barrels or bales, cargo tongs may be used for transferring, simple clamps being employed to hold the tongs in position on the cable. Where sheave block 62 is higher than block 63, the weight of the cargo will usually suffice to carry the goods to the shore.

If necessary, however, the cable may readily be moved by hand or power. As the goods arrive at the shore the cargo tongs may be lifted off of the cable and the goods suitably stored or shipped, as desired. The cargo tongs are then placed on the return flight of the cable and sent back to the ship. It will be observed that the sheaves in the blocks are of large diameter and they are mounted on the supports at an angle, so that the tongs on their return to the ship will carry clear of the cargo being carried to the shore.

Figure 6:
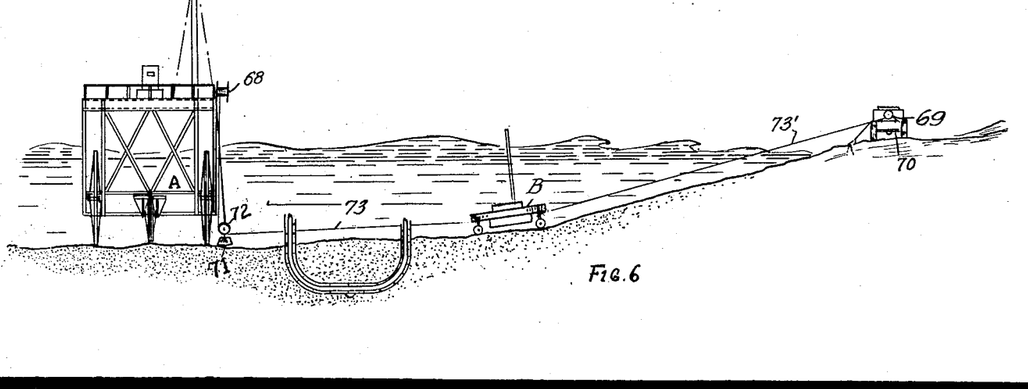
Fig. 6 shows the apparatus traveling offshore parallel to the shoreline, and operating in conjunction with a truck on shore, in searching for sunken hulks of vessels that may be partly or entirely embedded in the bottom.

Fig. 6 illustrates the use of my appaartus in searching for sunken wrecks that may be partly or entirely embedded in the bottom. In this operation the mobile apparatus A takes a course parallel to the beach and preferably beyond the surf. On the platform of the apparatus is mounted a power operated drum 68, preferably driven by shaft 14 and carrying a bronze wire cable 73 having a copper tube embedded therein for the purpose of supplying air under pressure to a submarine exploring apparatus B (see Figs. 9, 10 and 11). Another bronze cable 73' leads to a power-operated drum 69 on a truck 70 on the shore.

The submarine apparatus B is preferably made of bronze, so that magnetic or radio instruments sensitive to ferrous metals may be installed and used to indicate the presence of such metals when the submarine apparatus B is being dragged over the waterbed. As all ships contain certain quantities of ferrous metals, either in their structure, or as anchors and chains, any finding device sensitive to such metals may be used.

The method of procedure with the apparatus illustrated in Fig. 6 is as follows:

The mobile apparatus A and the truck 70 travel parallel courses, the mobile apparatus traveling at a depth beyond that at which it is assumed vessels are likely to have stranded, and the truck on the beach near the water's edge. A heavy weight 71 carrying a sheave block 72 through which the air conduction cable 73 is led, is shown resting on the bottom. The conducting cable 73 is led from drum 68 through stuffing boxes, hereinafter referred to, into the interior of the wreck finder B, and the similar cable 73' is led from the opposite end of wreck finder B to the drum 69 of the truck 70. Apparatus A and truck 70 now proceed at slow speed down the beach with the cable 73 dragging on the waterbed. If any wreck or wreckage extends above the bottom the cable 73 will get caught on it and as the two cable carriers A and 70 progress they will lift the weight 71 above the waterbed.

However, if a hulk is entirely below the surface of the waterbed the cable will pass over it and not disclose its presence and, therefore, when searching for long lost vessels which may have been completely buried, the procedure is somewhat different. In this procedure the end carriers proceed only a few yards at a time and then come to rest, and the submarine apparatus B is then dragged over the bottom between the shore and apparatus A by means of the cables 73 and 73'. The apparatus B carries detecting instruments and an inspector inside of it. And if it passes over any ferrous metals the operator will have instant knowledge of it and can give a signal to stop. Then the apparatus A is brought to the place, and, by means of its inspection tube, sand pump, derricks, etc., it can readily determine to what the ferrous metals may be attached. If the find is considered of importance, salvage operations amy be conducted as described in relation to Fig. 4.

The submarine exploring apparatus or wreck finder B will be described more in detail hereinafter.

Figure 7:
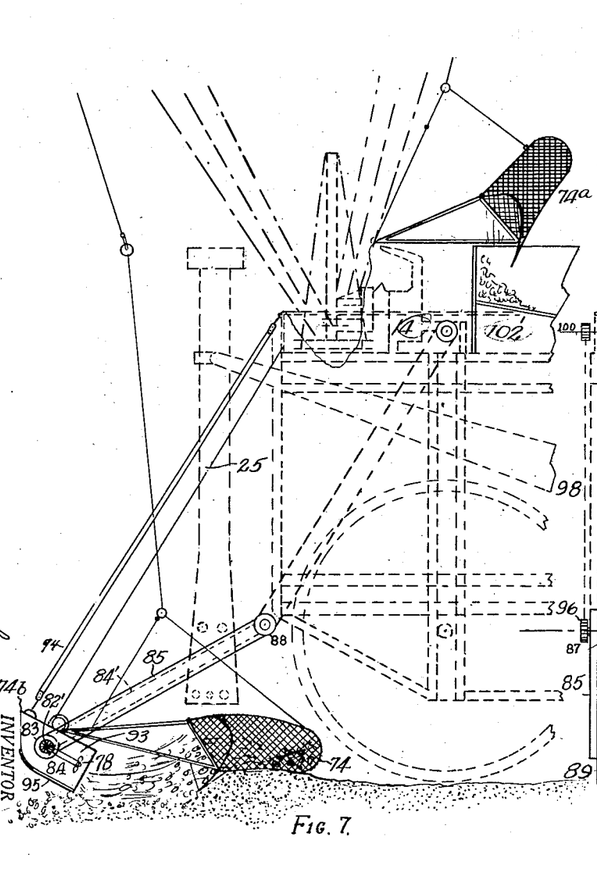
Fig. 7 shows the attachments for the operation of dredging for oysters, clams or other shellfish, the main frame and other parts of the apparatus appearing in broken lines.
Figure 8:
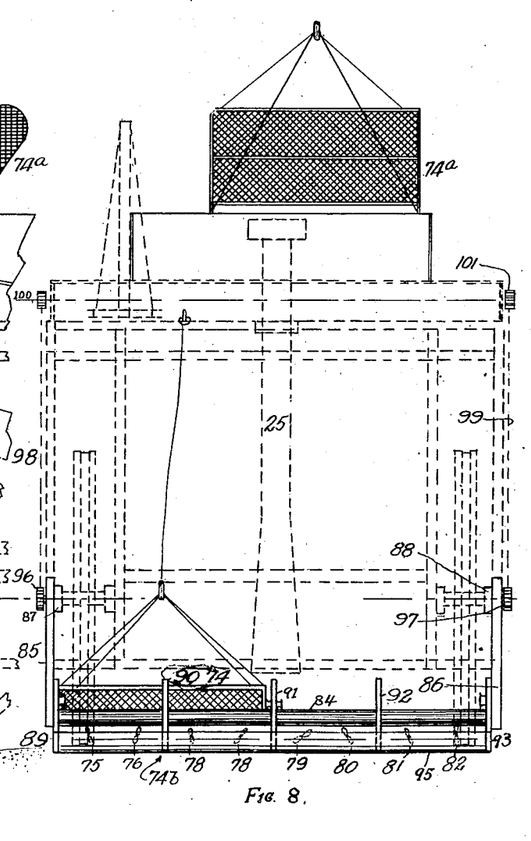
Fig. 8 is an end view of the apparatus as shown in Fig. 7 and looking toward the right of Fig. 7.

In harvesting the natural products of the sea, such as shellfish of various kinds which grow on the surface of or embedded in the waterbed, I may use dredges, as illustrated at 74 and 74a, Figs. 7 and 8, and to prevent the wheels of the apparatus from crushing live shellfish I prefer to carry forward of the apparatus one or more sled-like dredge elements 74b of sufficient width to clear the waterbed in advance of the wheels. Certain kinds of shellfish, such as the quahaug, soft shell, long neck and razor clam, burrow beneath the surface of the waterbed. Some of these burrow quite deep, and I have found large sizes at a depth of 20 inches below the surface. In gathering clams of this variety it is impossible to dredge them, because their shells are so thin and friable that they are apt to crush. However, with my apparatus I am enabled to gather them by washing them out of the bottom by the use of a number of propellers 75, 76, 77, 78, 79, 80, 81 and 82, carried by the sled-like dredge element 74b, as indicated in Fig. 8. These propellers may be driven by a longitudinal shaft and miter gears 83 enclosed in a tube 84, as shown somewhat diagrammatically in Fig. 7. The tube 84 is rotatably secured in hollow guide arms 85 and 86 pivoted to the main structure of apparatus A at 87 and 88.

Sled shaped plates or runners 89, 90, 91, 92 and 93 are welded to tube 84 and will automatically lift the tube and propellers over small rocks or boulders. If larger boulders or obstructions of sufficient size to stop the progress of the apparatus are encountered, the tube and propellers may be raised by block and falls as indicated at 94. A toboggan shaped plate 95 is preferably attached to the sled shaped runners to give protection to the propeller blades as the apparatus progresses.

The longitudinal shaft in tube 84 is driven by chain and sprocket gearing 84' enclosed in the hollow guide arms 85 and 86, and this gearing is driven through sprockets 96 and 97 and chains indicated at 98 and 99 from extensions of the shafts 14 and 15 carrying sprocket wheels 100 and 102.

In Figs. 7 and 8 I have shown dredge 74 on the bottom, and its companion dredge 74a is dumping its catch onto the receiving and sorting platform. The dredges are lifted from the waterbed by suitable lines and a rotating derrick, as illustrated.

In harvesting shellfish it will be readily seen that I can systematically clean up the waterbeds by traversing parallel courses and back tracking the course previously followed, by swinging the inspection tube 25 over to one side so as to enable the pilot to observe and follow the lines previously made on the waterbed by one of the wheels when traveling in the opposite direction.

Figures 9, 11:
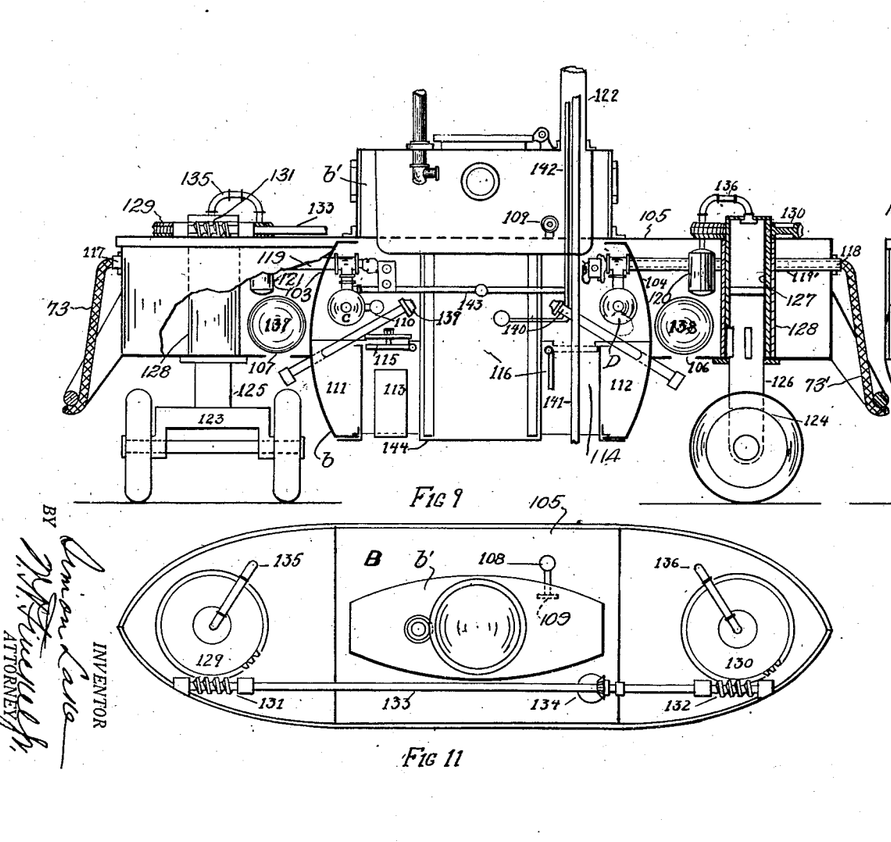
Fig. 9 is a longitudinal sectional elevation of an auxiliary attachment for detecting the presence of the hulk of a vessel or of metallic material lying entirely under the water bed.
Fig. 11 is a plan view of the apparatus of Fig. 9.
Figure 10:
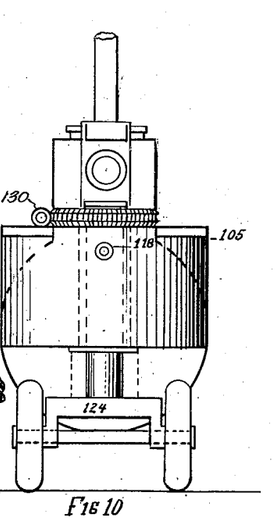
Fig. 10 is an end view of the apparatus of Fig. 9 looking toward the left of Fig. 9.

The submarine exploring apparatus or wreck finder B, Figs. 9, 10 and 11, comprises a pressure-resisting tank-shaped hull b, with flanged heads 103 and 104. A relatively light non-pressure-resisting superstructure 105 is built over the upper portion of the tank-shaped hull and is provided with openings 106 and 107 at its bottom. An exteriorly arranged vent valve 108 is operated by valve wheel 109 arranged within the conning tower b', and this valve when opened permits the water to flow freely through openings 106 and 107 and fill the superstructure 105. By closing vent valve 108 and admitting air under pressure into the superstructure from a compressed air reservoir C by opening a valve 110 the water is forced out, thus making the apparatus more buoyant. Additional water ballast compartments 111 and 112 in the hull b may be filled or emptied in the manner customary in filling and emptying water ballast compartments in submarine vessels, as is found necessary or desirable.

Wells 113 and 114 are built within the water ballast tanks 111 and 112 and are open at the bottom and provided with hinged doors 115 and 116 shown closed and open respectively. The purpose of wells 113 and 114 is to permit investigation of the waterbed and to locate submerged objects lying below the surface of the waterbed, as will be later described. The cables 73 and 73' hereinbefore referred to pass into the apparatus through stuffing boxes 117 and 118, and the tubes therein permit air being pumped to the wreck finder B from two air compressor plants, one located on the apparatus A and the other on the truck 70 on shore as described. The cable 73 enters the wreck finder B through insulation lined pipe 119 and cable 73' enters through a similar pipe 119'. The opposite ends of these cables enter the pressure-resisting winding drums 68 and 69 carried by the apparatus A and truck 70, respectively, and are also insulated in such a manner as to permit their metallic portions to be utilized for carrying an electric current for telephoning or power purposes. The air is delivered into tanks C and D and pipe lines, not shown, are led respectively to the tops of tanks 111 and 112, wells 113 and 114, and to air tanks 120 and 121 in the superstructure. Suitable vent valves, not shown, placed between the supply valves on tanks C and D and the ballast tanks and air tanks 120 and 121 permit the pressure to be released from these various tanks, whence it enters the hull and escapes to atmosphere through a check valve at the top of the hollow mast 122.

As the wreck finder B is designed to be operated in deep water, in the surf or hauled up on land, I provide it with two pairs of cushioned wheels carried by rotatable trucks 123 and 124. These trucks are formed with heavy pistons 125 and 126 housed in rotatable cylinders, as shown in section at 127, and these cylinders rotate in bearings 128. At the top of the cylinders I fit worm wheels 129 and 130 meshing with driving worms 131 and 132 carried on a shaft 133 mounted in suitable bearings. The shaft 133 is driven by a pair of miter gears 134 from a shaft leading through a stuffing box into the interior of the wreck finder B and provided with suitable actuating means which permit an operator to turn the trucks and wheels in any direction. When operating on shore or when being hauled through shallow water or in the surf, the truck and wheels must be placed in position as shown at 124 so as to permit travel substantially in line with the longitudinal axis of the wreck finder to thus maintain it in an upright position, but when entirely submerged in deep water the trucks may be placed as shown at 123, thus permitting the wreck finder to be hauled sidewise or parallel to the beach, its upright position then being maintained by the fact that the apparatus has static stability due to the difference between its center of buoyancy and its center of gravity in a submerged condition.

Air pipes 135 and 136 lead from the air reservoirs 120 and 121, respectively, to the cylinders above the pistons 125 and 126 and by varying the air pressure the wreck finder may be adjusted above the waterbed to a desired height. This is of importance in investigating conditions below the waterbed, as will be later described. Auxiliary water ballast tanks 137 and 138 are provided for regulating the buoyancy of the apparatus. Aquascopes 139 and 140 enable an operator to view the waterbed when being hauled over it in either direction. A hollow core drill 141 for drilling test and other holes in the waterbed is extensibly carried by the apparatus and may be housed in mast 122, when door 116 is closed. An air hose 142 is attached to the upper end of the hollow drill 141 for supplying air from reservoirs C and D through air line 143 to clear the drill when operating.

A section of pipe 144 extensibly mounted within the hull may be used as a well curbing or dam in making investigations below the waterbed.

As previously explained, when searching for objects above the waterbed, the cables 73 or 73' being dragged over the waterbed hauling the wreck finder B with its trucks and wheels set in position as shown at 123 permits of rapidly covering the waterbed, as it is possible for the carrier A and truck 70 to proceed at the rate of two or three miles per hour, but if the wreck has settled in the bottom so that nothing extends above the waterbed, a different procedure must be followed.

Many ships containing valuable imperishable cargoes have been sunk in shallow coastal waters and have entirely disappeared below the light sands and gravel commonly found along the coast, and we will, for purposes of illustration, take a typical case of a ship containing a valuable cargo, sunk by stranding in about 20 feet of water off the coast of New Jersey 100 or more years ago. As the sands off the Jersey coast are fine, and the surf, in times of northeast or southwest storms, is heavy, it is quite certain that any vessel stranding in such a depth and with her bottom punctured would very soon be filled with sand and would continue to work down into the waterbed as long as the seas could move her, as has been previously described.

It is also equally certain that if she was a wooden ship the heavy surf would eventually carry away her upper works, leaving her bottom and sides intact up to where the upper works had been broken off by the seas, substantially as shown at 45 in Fig. 4. When the upper part of the wreck is carried away so that wave action currents or undertow meets with no obstruction to retard its movement above the waterbed, the remainder of the hulk ceases to move or settle further, but as time passes the timbers above the waterbed may be partly eaten away by the toredo or eroded away by the sharp sand held in suspension in the water, as generally occurs near the shore in time of storm, so there is nothing left above the sea bottom to indicate that a hulk containing valuables lies buried beneath the surface of the waterbed. Old records show that hundreds of vessels have thus entirely disappeared. To find them we arrange the various apparatus as shown in Fig. 6. Apparatus A is shown off-shore in about 24 ft. of water and truck 70 on the beach with wreck finder B being hauled back and forth between them every few yards. As hereinbefore explained, wreck finder B and all its equipment may preferably be made of bronze, so that magnetic detection may be used without interference from within the apparatus itself. There are various kinds of electrical detectors sensitive to metals which may be used, but to illustrate the principles of operation we will assume that we are using a simple magnetic compass or dipping needle. When the wreck finder B is on the bottom such a compass, located in one of the open wells 113, 114 will normally point towards the north magnetic pole, but in coming near a body of iron or other ferrous metals it will be deflected towards that metal if brought into fairly close proximity to it. As explained, most ships carry ferrous metals within their hulls, especially anchors and chains, chain plates, bolts, cleats, etc., which are rather widely distributed throughout the vessel, and therefore a sensitive dipping needle passed only a few inches over the surface of the waterbed where such a hulk comparatively recently covered by the sand is located, would be pretty sure to be attracted, and would point to the location of the ferrous metal.

Various improvements in metal indicators are being made, in which radio and other electric apparatus are being used and such devices are effective for much greater distances than the magnetic needle. Any of such devices may readily be installed in the wreck finder B and the wreck finder placed over the spot where the instruments indicate that metals may be found.

Some manufacturers claim they also make instruments that are sensitive to non-ferrous metals, such as gold, copper, lead, etc., and such instruments may also be used if found more suitable.

When the wreck finder is brought over the spot where metals are believed to be, an air pressure is built up within the hull equal to the water pressure at the bottom of the wells 113 and 114, and then doors 115 and 116 may be opened and as no water can enter, due to the balance of pressures, an investigation can be made of what lies under the surface of the waterbed. The hollow core drill 141 may be used for this purpose, and, when air under pressure is turned on through pipe 142, the drill may be pushed down into the waterbed, the air under pressure blowing the sand away from the open end and causing it to rise up alongside of the drill. If the drill strikes iron there is a metallic sound and if it strikes wood a few revolutions imparted to the drill by means of an ordinary turning bar will bring up a sample of the wood in the hollow end of the drill, thus indicating the presence of wreckage. By traveling back and forth and drilling other test holes the size of the sand-covered hulk or wreckage can readily be determined. In some cases it might be desirable to sink test holes of larger diameter, and in this case the member 144 may be lowered and forced down into the waterbed to act like a well curb or dam, additional similar sections being added to the member 144 as the sand is blown out by means of compressed air directed at the leading inside edge of the member 144. After the size of the buried hulk or wreckage is determined and its outline buoyed, the apparatus A may be brought into the approximate position shown in Fig. 4 and the cargo recovered.

Swimming fish may also be readily caught along the shores of the ocean or in inland shallow waters. It is well known that fish often collect near the shore, especially when there is a heavy surf, to feed upon the shellfish, crustaceans and other natural products washed out of the waterbed at such times.

In time of storm and heavy surf, surface boats cannot operate near the shore or put out seines, but with this combination of apparatus A carrying one end of a seine and the truck 70 dragging its other end on shore and traveling parallel to the beach, hauls may readily be made in the surf itself, and when the seine becomes loaded with fish, apparatus A is wheeled ashore hauling the trapped fish up onto the beach.

Figures 12, 13:
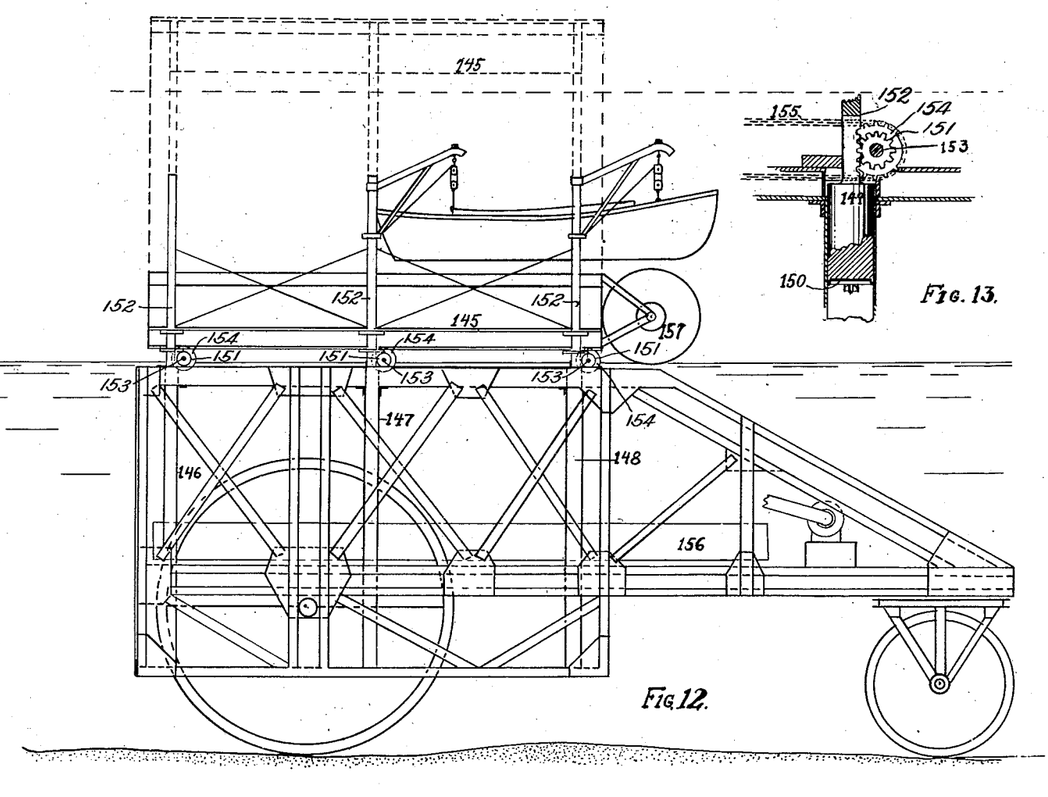
Fig. 12 is a side elevation of a modification of the apparatus of Fig. 1, showing an elevating platform to adapt the apparatus for deeper water.
Fig. 13 shows an enlarged sectional detail of a portion of the platform elevating gear.

Referring now to Figs. 12 and 13, it will be seen that a mobile structure similar to that shown in Figs. 1 and 2 may be provided with a platform 145 mounted on a plurality, preferably six, of piston rods 152 provided with teeth which form racks engaged by pinions 151. These rack-forming rods 152 are carried by pistons 149 slidable in cylinders carried by the frame of the apparatus, three of which are shown at 146, 147 and 148, and these pistons are fitted with cup leathers 150. The pistons and their rods are moved by fluid pressure acting between the cylinder heads and the pistons in the usual manner of operating hydraulic rams, and all pistons are caused to rise in unison due to the fact that the shafts 153 carrying the pinions 151 are coupled together by sprocket wheels 154 and sprocket chains or link belts 155. Thus the platform 145 may be raised and lowered, as desired. The piston rods are shown extended above the platform and davits may be attached to them for handling life boats which may be launched and used to convey passengers or crew from a stranded vessel which might be rolling so severely as to make it unsafe for the rescue apparatus to approach too closely.

The ability to elevate the platform after once getting out beyond the surf in deeper and more quiet waters very naturally increases the area of waterbed that may be covered with this apparatus. An apparatus of the type illustrated in Fig. 1 and approximately thirty-six feet high from platform to ground would be able to operate at depths of thirty-two feet, but with the movable platform elevated, as shown in dotted lines in Fig. 12, it would be able to operate in depths up to fifty-four feet, and as the average increase of depth on the Atlantic coast from Cape Cod to Cape Hatteras is only about six feet per mile, the ability to operate at added depths will increase the working area by several thousand square miles.

Where mud bottom exists of a consistency insufficient to support the weight of the structure I may employ buoyant tanks 156 attached to the frame to carry part of the weight.

The seine referred to may be carried upon a large reel 157, to which one end may be attached and its other end may be connected to a truck traveling on shore, as described, or such other end may be carried by another similar harvesting apparatus and thus the seine may be operated without any land attachment whatever. This will provide a more economical method of harvesting swimming fish or bottom creeping crustaceans within the depth capacity of the apparatus, than in operating with seines from surface boats, due to the more powerful and efficient pull that can be secured when traveling on the waterbed itself.

I do not limit myself to the exact details of apparatus as shown or methods of operating the various attachments and accessories described, as it is obvious that various modifications may be made in the construction and operation of the apparatus without departing from the spirit of the invention and the scope of the following claims.

What I claim is:—

1. A marine rescue, salvage and harvesting apparatus, comprising a structure supported on wheels and including a platform normally above the water level, means for propelling said apparatus over the waterbed, a boom pivotally mounted on said structure and provided with means whereby its pivot may be adjusted longitudinally of said structure, and an inspection tube capable of accommodating an operative, and having a portion normally extending into proximity to said platform, and furnishing a means of access to said tube, and a portion projectable beneath the surface of the water, said tube pivotally carried by said boom and capable of swinging movement thereon, whereby the waterbed may be examined in all directions within a predetermined compass as the apparatus is being propelled over it.

2. A marine rescue, salvaging and harvesting apparatus, including a wheeled structure, a submersible inspection tube carried by said structure and provided with an inspection chamber adjacent to its lower end, and means including a boom having a pivot member adjustable longitudinally of said structure for raising, lowering, projecting, retracting and swinging said inspection tube.

3. A marine rescue, salvaging and harvesting apparatus, including a mobile structure, a boom pivotally carried by said structure and having its pivot adjustable longitudinally of the structure, an inspection tube pivotally carried by said boom and provided with a diver's compartment, means for raising, lowering, swinging, projecting and retracting said boom, and means for pivotally adjusting said inspection tube with respect to said boom to enable an inspector in said diver's compartment to scan the waterbed over a considerable area.

4. A marine salvaging apparatus, including a mobile structure, an inspection tube carried by said structure and provided with an air lock and diver's compartment, and a cage carried by said tube and arranged below the end thereof, said cage providing a submerged platform outside the confines of said tube and surrounding guards to protect a diver from injury while working submerged.

5. A marine harvesting apparatus, comprising a mobile wheeled frame, means adjustably carried by said frame for agitating the surface of the waterbed, dredges carried by said frame in position to follow in the wake of said agitating means and arranged to rake up objects from the waterbed, and means for raising and lowering said dredges relatively to said frame and to the waterbed and for adjusting same with respect to said agitating means.

6. A marine harvesting apparatus, comprising a mobile wheeled frame, a dredge carried by said frame in position to be dragged on the waterbed, means carried by said frame in advance of said dredge and provided with propellers adapted to agitate the waterbed, said propellers adapted to wash shellfish out of the waterbed and into the dredge, and means for raising and lowering said dredge relatively to said frame and to the waterbed.

SIMON LAKE.